United States Patent [19]

Deckrow

[11] 4,049,289
[45] Sept. 20, 1977

[54] COMPOSITE AUTOMOTIVE VEHICLE, COMPONENTS THEREOF, AND A METHOD OF CONSTRUCTING AND USING THE SAME

[76] Inventor: Rodger E. Deckrow, 3838 Seaman Road, Alma, Mich. 48801

[21] Appl. No.: 700,076

[22] Filed: June 28, 1976

[51] Int. Cl.² .......................................... B62D 53/06
[52] U.S. Cl. ............................................. 280/423 R
[58] Field of Search ............... 280/404, 405 A, 415 R, 280/415 B, 423 R, 423 A, 81 R

[56] References Cited

U.S. PATENT DOCUMENTS 3,163,306  12/1964  Bennett .................... 280/423 R X

FOREIGN PATENT DOCUMENTS

82,532  2/1935  Sweden ........................... 280/423 R

Primary Examiner—Joseph F. Peters, Jr.
Assistant Examiner—R. Schrecengost
Attorney, Agent, or Firm—L. S. Van Landingham, Jr.

[57] ABSTRACT

An automotive draft vehicle and an independent load platform are provided which are especially adapted for use as the components of a unique composite automotive vehicle. The resulting composite vehicle utilizes the basic carry-pull technique of a conventional composite rig formed from a prior art truck tractor and a semitrailer, but the load platform is captured against lateral movement and does not have the tracking characteristics of a semitrailer. Also, the composite vehicle retains the handling-steering characteristics of the draft vehicle. A method of constructing and/or using the aforementioned composite vehicle and/or the components thereof is also provided. The invention is especially useful in restructuring basic two-axle four-wheel and six-wheel trucks of the lighter duty series for use as the draft vehicle component, and in adapting prior art semitrailers for use therewith as the independent load platform component.

29 Claims, 13 Drawing Figures

COMPOSITE AUTOMOTIVE VEHICLE, COMPONENTS THEREOF, AND A METHOD OF CONSTRUCTING AND USING THE SAME

THE BACKGROUND OF THE INVENTION

1. The Field of the Invention

The present invention broadly relates to an improved composite automotive vehicle for use in transporting payloads. In some of its more specific aspects, the invention is also concerned with an improved automotive draft vehicle and/or independent load platform, each of which is especially adapted for use as a component in the composite automotive vehicle. In still other aspects, the invention is concerned with a method of constructing and using the aforementioned composite automotive vehicle, automotive draft vehicle and/or independent load platform.

2. The Prior Art

The payload capacity of automotive vehicles of the type normally carrying the entire payload have inherent restrictions. The payload is supported entirely upon the integral suspension system and in such instances the weight must not exceed the design limitations. Additionally, the steering and handling characteristics tend to change as the payload is increased and often are adversely affected very markedly as the maximum payload design limitations are approached.

The composite method of transporting payloads is intrinsically much more efficient than where the payload is totally carried by the vehicle. This concept is based upon a composite arrangement which includes an automotive draft vehicle such as a truck tractor as one component and a conventional semitrailer as the second component. The resultant composite rig is one in which the total payload capacity is only partially carried by the truck tractor and the balance is supported on the semitrailer and is pulled. The ratio of the total payload capacity to the availabile horsepower rating for the truck tractor is greater when using a composite rig and the efficiency is much higher. However, composite rigs have a number of disadvantages when compared with a singular form truck. The steering and drawing characteristics of a composite rig are much different and are generally considered to be less desirable. The semitrailer does not tag true behind the drive wheels of the truck tractor and special driving techniques are required. There is also a tendency for the composite rig to "Jack-Knife" under certain conditions and thus safety considerations usually favor the singular form truck.

It has been proposed heretofore to increase the payload capacity of a singular form truck by extending the length and adding a second drive axle and a suspension system and wheels therefor immediately behind the first drive axle. This proposal has not proved to be entirely satisfactory. The increased payload still must be totally carried by the integral suspension system and the disadvantages noted above for vehicles of this type apply. There is a further disadvantage when the resultant three-axle truck is used to transport a heavy payload over unlevel surfaces. In such instances, the weight of the payload is not distributed evenly between the axles and there is a tendency to overload at least one axle and its integral suspension system beyond the design limitations.

It is apparent from the foregoing that it would be very advantageous to provide an improved composite automotive vehicle for transporting payloads which has all of the desirable features and capabilities of singular form trucks and composite rigs, while avoiding the undesirable features and disadvantages. However, a vehicle having these characteristics was not available prior to the present invention.

THE SUMMARY OF THE INVENTION

The present invention is concerned with a novel concept for upgrading the payload capacity of automotive vehicles of the type that normally carry the entire payload upon an integral suspension system. The concept is based upon utilizing a composite arrangement of an automotive draft vehicle and an independent load platform to obtain the carry-pull technique and increased payload capacity characteristic of a composite rig while avoiding the disadvantages thereof. The load platform is captured against lateral movement and the final composite vehicle has the handling and steering characteristics of the singular form vehicle which is improved upon. The invention is especially useful in restructuring basic two axle four wheel and six wheel trucks of the lighter duty series for use as the draft vehicle component and adapting prior art semitrailers for use therewith as the independent load platform component. The invention is also concerned with a method of constructing and/or using the aforementioned composite vehicle and/or the components thereof.

It is an object of the present invention to provide an improved composite automotive vehicle for use in transporting payloads.

It is a further object to provide an improved draft automotive vehicle and/or independent load platform which are especially adapted for use as components in constructing the composite automotive vehicle of the invention.

It is still a further object to provide a method of constructing and using the aforementioned composite automotive vehicle, automotive draft vehicle and/or independent load platform of the invention.

Still other objects and advantages of the invention will be apparent to those skilled in the art upon reference to the following detailed description and the accompanying drawings.

A BRIEF DESCRIPTION OF THE ACCOMPANYING DRAWINGS

The invention will be described hereinafter in greater particularity with reference to the presently preferred embodiments thereof illustrated in the accompanying drawings, wherein.

THE DETAILED DESCRIPTION OF THE INVENTION INCLUDING THE PRESENTLY PREFERRED VARIANTS AND EMBODIMENTS THEREOF

Referring now to the drawings, and more particularly to FIGS. 1, 2, 10 and 11, the composite automotive vehicle generally designated as 20 includes an automotive draft vehicle 21 and an independent load platform 22. The draft vehicle 21 is preferably a prior art two-axle four-wheel or six-wheel truck which has been restructured as described more fully hereinafter. The load platform 22 is preferably a prior art semitrailer which has been especially adapted for use with the restructured draft vehicle 21, as likewise will be more fully described hereinafter. In the interest of simplifying the discussion, the draft vehicle 21 will be referred to hereinafter as truck 21.

Figure 1:
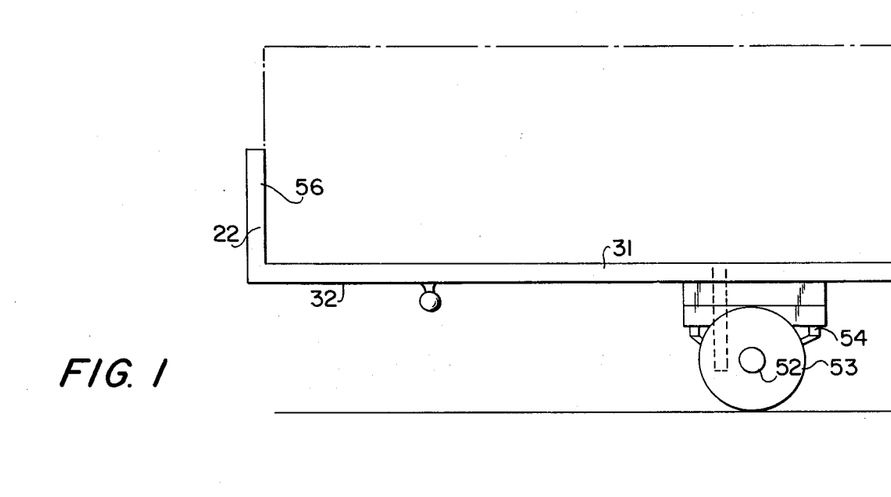
FIG. 1 is a side view in elevation of an independent load platform constructed in accordance with the principles of the present invention.
Figure 2:
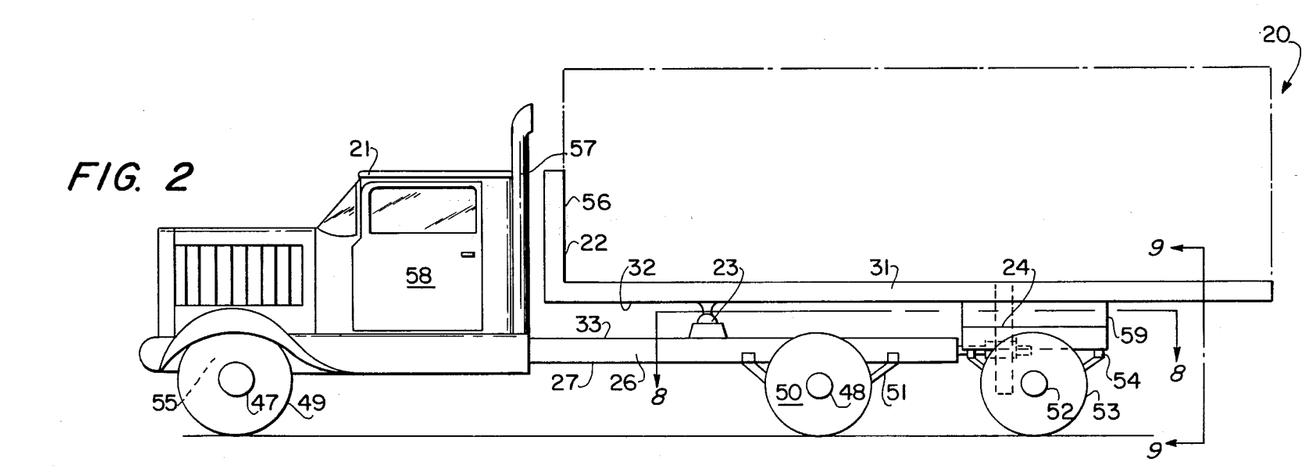
FIG. 2 is a side view in elevation of one presently preferred composite arrangement of (a) an automotive draft vehicle constructed in accordance with the principles of the present invention, and (b) the load platform of FIG. 1.
Figure 3:
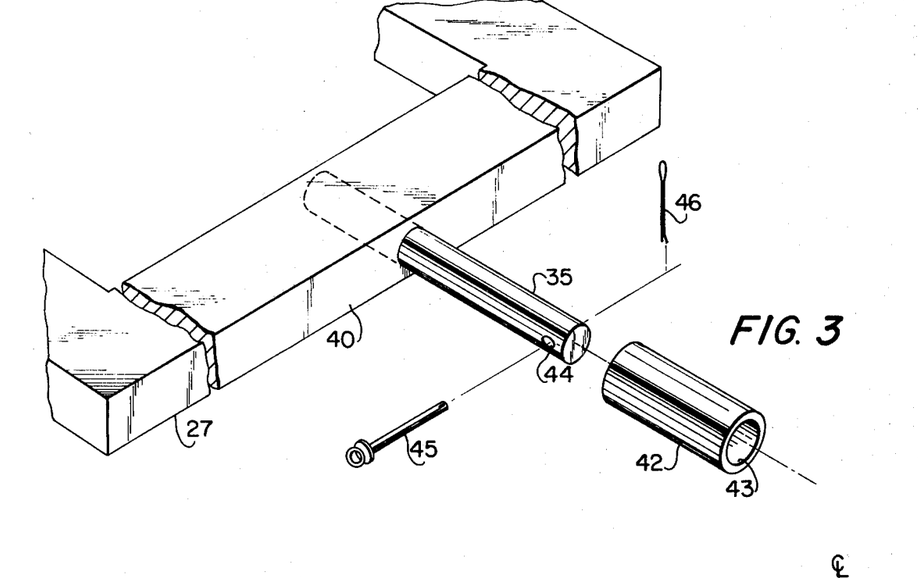
FIG. 3 is a fragmentary exploded view of the probe and associated apparatus which extends rearwardly from the frame of the draft vehicle of FIG. 2.
Figure 10:
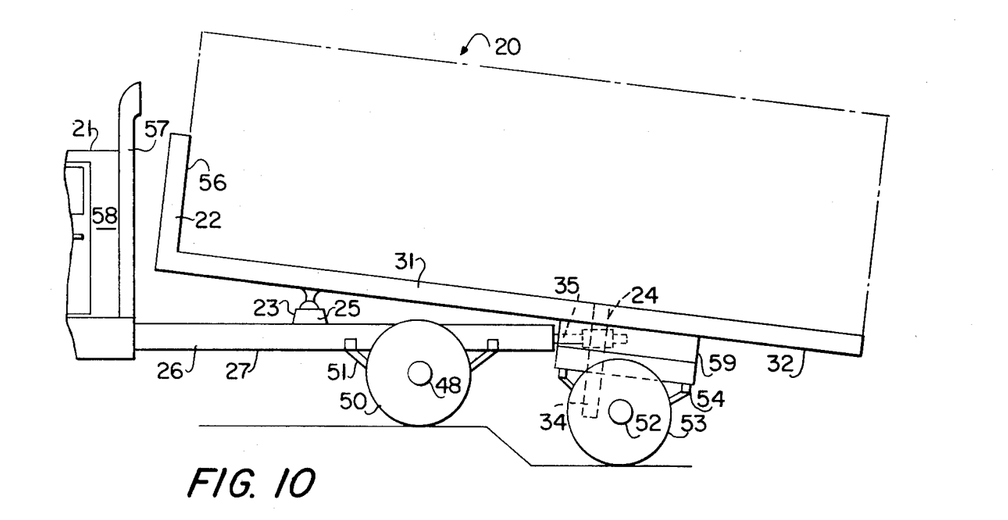
FIG. 10 is a side view in elevation of the composite automotive vehicle of FIG. 2, with the front portion of the draft vehicle being broken away for purposes of clarity, further illustrating the relative positions of the draft vehicle and load platform when traversing unlevel terrain with the wheels of the load platform supported on a markedly lower surface.
Figure 11:
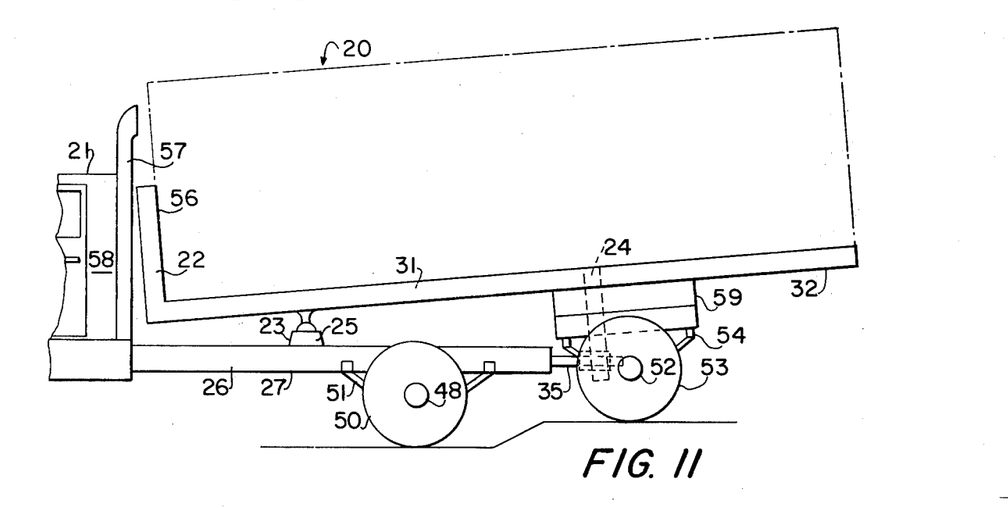
FIG. 11 is a view similar to FIG. 10, but illustrating the relative positions of the draft vehicle and the load platform when traversing unlevel terrain with the wheels of the load platform supported on a markedly higher surface.

Referring now to FIGS. 1-13 of the drawings, the truck 21 and the load platform 22 are provided with a primary ball joint coupler 23 and a secondary slide roll coupler 24. The ball joint coupler 23 includes a base member 25 securely attached to the frame member 26 of truck chassis 27. The base 25 extends upward from frame 26 a suitable distance to be described more fully hereinafter and has a socket 28 formed in the upper surface thereof of a size and depth for receiving the socket ball 29 in a secure seating relationship effective for pulling load platform 22. As is best seen in FIG. 5, the socket ball 29 is formed on the lower end of an elongated upright member 30 which is securely attached on its upper end to frame member 31 of load platform 22. As is best seen in FIGS. 2, 10 and 11, the combined height of base 25 and the length of member 30 are sufficient to support the lower surface of floor 32 of load platform 22 a substantial distance above the upper surface 33 of truck chassis 27 for the purposes described more fully hereinafter.

The secondary slide roll coupler 24 includes a slide 34 and a probe 35. The slide 34 is formed by spaced upright slide members 36 and 37 which are securely joined at their upper ends to frame member 38 of load platform 22 such as by welding, and on their lower ends to plate 39. The probe 35 is securely anchored on its forward end to cross member 40 of truck chassis 27 such as by welding, and extends rearward past the end of truck chassis 27 and is positioned with the space 41 formed between the slide members 36 and 37. The probe 35 is preferably round and is provided with a resilient round sleeve or roller 42 which has a longitudinally extending annular opening 43 therein of a diameter to easily receive the probe 35 and rotate thereon without undue friction. The rear end of probe 35 is inserted through the opening 43 and extends beyond sleeve 42 a distance sufficient to expose the transversely extending opening 44 therein. A stay pin 45 is inserted through opening 44 and is locked therein by means of cotter pin 46 for the purpose of retaining roller 42 on probe 35, and also for the purpose of temporarily keeping load platform 22 on truck 21 in the event of malfunction of coupler 23.

Figure 5:
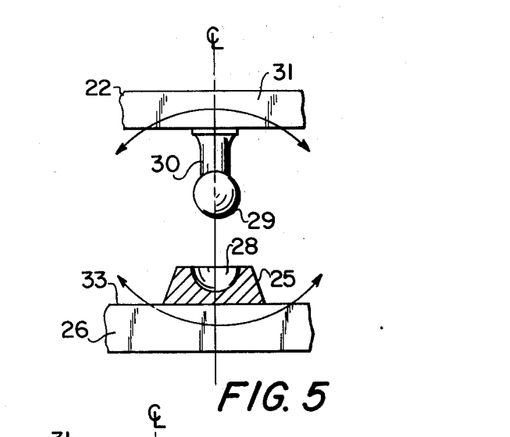
FIG. 5 is a fragmentary end view in elevation, partially in cross section, illustrating the construction and arrangement of the front coupler carried by the draft vehicle and the coupler ball depending downward from the load platform, and further illustrating the relative rotary movement thereof around the longitudinal axis in the direction of the arrows.
Figure 6:
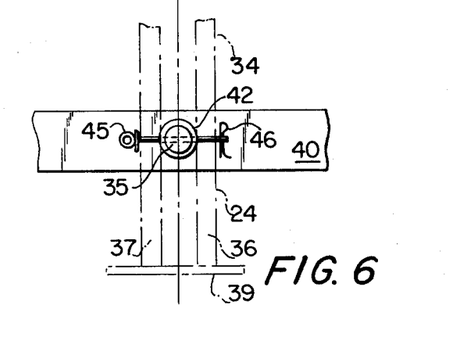
FIG. 6 is a fragmentary end view further illustrating the probe of FIG. 3 in working position in the slide of FIG. 4, the slide being shown in phantom line for purposes of clarity.
Figure 7:
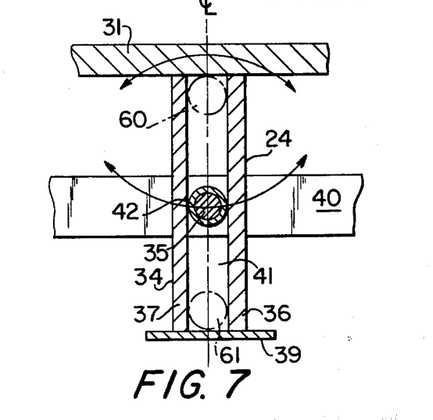
FIG. 7 is an end view of the probe and slide of FIGS. 4 and 6, partially in cross section, further illustrating the range of vertical movement of the probe within the slide by means of phantom lines.
Figure 8:
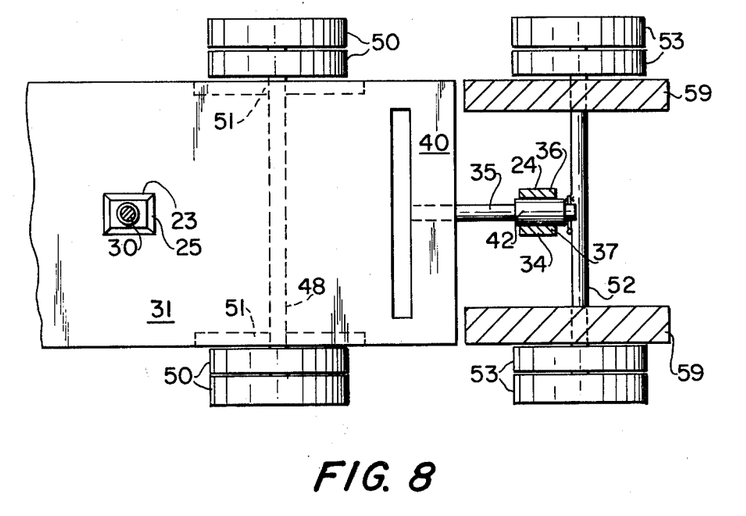
FIG. 8 is a top view, partially in cross section, taken along the line 8—8 of FIG. 2.
Figure 9:
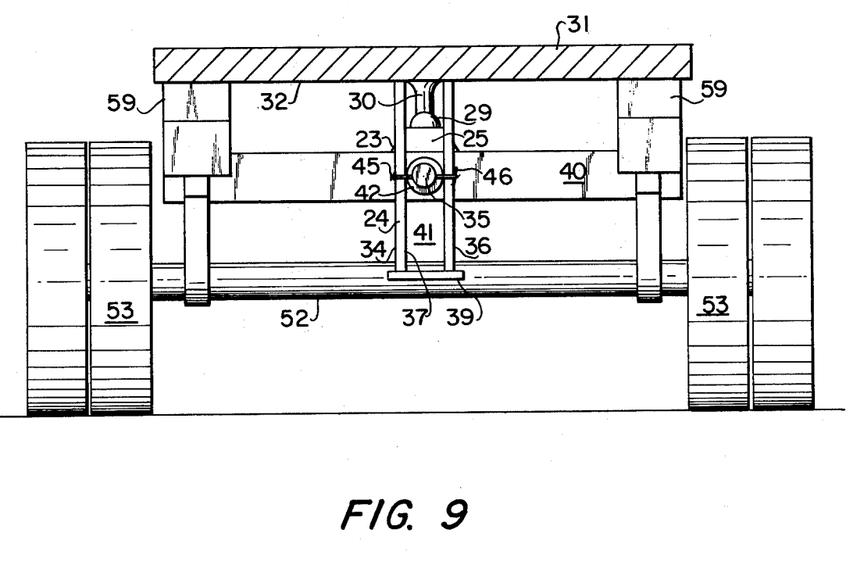
FIG. 9 is an end view in elevation, partially in cross section, taken along the line 9—9 of FIG. 2.

As is best seen in FIGS. 5, 6 and 7, the ball joint coupler 23 and the slide roller coupler 24 are positioned along the longitudinal center lines of the truck chassis 27 and the load platform 22. Thus, the load platform 22 is captured on its forward end by means of ball joint coupler 23, and on its rear end by means of slide roll coupler 24, with respect to substantial lateral or transverse movement relative to the centerline of truck chassis 27. This double coupling method is unique as it allows full articulated movement between the truck chassis 27 and the load platform 22 under any dynamic conditions associated with transversing unlevel surfaces while preventing substantial lateral movement.

In view of the foregoing discussion and with reference to FIGS. 1-13 of the drawings, it will be recognized by those skilled in this art that the restructured prior art truck 21 comprises a chassis 27 including a front or steering axle 47 and a rear or drive axle 48 which are supported at either end by wheels 49 and 50, respectively. The frame 26 extends between the axles 47 and 48 and is supported thereabove in a conventional manner by a prior art suspension system carried by the steering axle 47 in the vicinity of point 55, which is not shown in the interest of simplifying the drawings, and the suspension system 51 carried by the drive axle 48. The restructured prior art load platform 22 has a chassis including a tag axle 52 supported at either end by wheels 53. The tag axle 52 carries a suspension system 54 for supporting the frame member 31 thereabove. The base member 25 is preferably located along the longitudinal centerline of truck chassis 27 and at about the designed payload center of gravity with respect to the front and rear suspensions 55 and 51, respectively. This provides for the proper relative loading of the front suspension 55 and the rear suspension 51 initially and prevents overloading of each individual axle in excess of the design limitations. It also prevents undue lightening of the front end of chassis 27 with the accompanying poor steering and handling characteristics when heavy loads are hauled.

The independent load platform 22 has what may be considered to be two payload zones, one being a forward payload zone in the general vicinity of the primary coupler 23 and the second being a rear payload zone in the general vicinity of the secondary coupler 24, which provide a total payload capacity for the composite vehicle 20. The maximum capacity of the front payload zone is equal to the original payload capacity of the basic truck 21, which in turn is largely dependent upon the design capacity of the front and rear axles 47 and 48 and suspensions 55 and 51, respectively. The maximum capacity of the rear payload zone is equal to the design payload capacity of the tag axle 52 and the suspension system 54. The weight of the payload in the front zone is transferred to and is carried or borne by the front and rear axles 47 and 48 and the front and rear suspensions 55 and 51, respectively, by means of primary coupler 23. The payload weight in the rear zone is carried or borne by the tag axle 52 and the suspension system 54, and is the extended payload capacity which is pulled by the truck 21. Thus, the truck 21 and independent load platform 22 are structured so as to be capable of forming a composite vehicle 20 in which the total payload capacity is only partially carried by the truck 21, and the balance of the payload capacity is carried by the load platform 22 and is pulled by the truck 21. This resulting composite method of load hauling increases the effective length of the load bearing platform of a singular form truck, and also results in an increase of the total maximum payload capacity thereof. These advantages are gained while retaining the normal steering and handling characteristics of the standard singular form truck prior to restructuring.

The above described composite method of load hauling overcomes the payload design limitations, both in load platform length and total payload capacity, that are imposed by the suspension systems of standard four wheel or six wheel truck units. These limitations are most restrictive in the lighter duty truck series and the present invention shows the greatest improvement therein, but there is also substantial improvement in restructuring standard truck units of the more costly larger and heavier sprung series. In each instance, the available horsepower for a given truck unit is capable of hauling a much larger total payload capacity without sacrificing the original handling and steering characteristics.

The primary coupler 23 and the secondary coupler 24 are employed to achieve a precise controlled joining or coupling of the truck 21 to the load platform 22. The resulting double-coupling method is unique and is necessary to facilitate the desired conditions of payload distribution and load platform control and obtain a justaposed position which is closely adjacent to the rear of the truck cab 58 and rear axle 48. The double coupling method is also necessary to insure a positive articulated positioning of the load platform 22 in all dynamic movement planes except for the designed capture thereof in the lateral plane at the points of coupling with the primary and secondary couplers 23 and 24. The lateral capture creates a true tagging effect and the load platform 22 does not trailer as a semitrailer. This is responsible for the composite vehicle 20 retaining the handling and steering characteristics of the basic truck 21. The lateral capture also makes it possible to position the load platform 22 closer to the truck cab 58 and maintain the necessary minimum clearance between the front end 56 of load platform 22 and the rear end 57 of cab 58.

Articulated movement of the load platform 22 under any dynamic conditions associated with transversing unlevel surfaces, with the exception of in the lateral plane, is important to the system of the invention. The articulated movements made possible by primary coupler 23 and secondary coupler 24 allow the truck drive axle 48 and the wheels 50 supporting the same, and the tag axle 52 and the wheels 53 supporting the same, to assume wide range differential positions both above and below the normal or horizontal surface of the road plane. Perhaps even more important, the arrangement prevents any one axle from dynamically assuming the total payload carried by platform 22, and it also prevents individual axle overloads in general which are above the maximum design limitations. Thus, the invention overcomes one important disadvantage which is generally typical of tag axle adaptations due to the limited differential movement between the various axles when traversing unlevel terrain.

Figure 4:
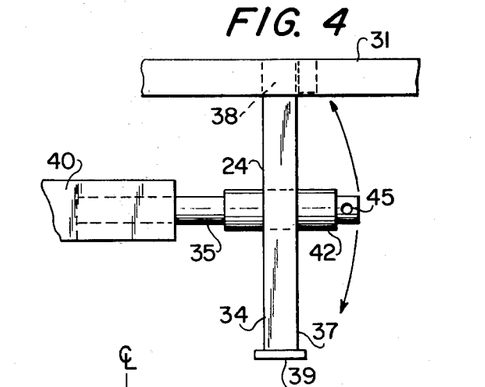
FIG. 4 is a fragmentary side view in elevation illustrating the probe of FIG. 3 in working position within the slide which depends downward from the load platform, and further illustrating the range of vertical movement of the probe within the slide in the direction of the arrows.
Figure 12:
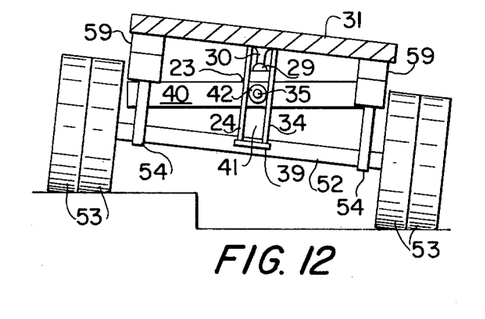
FIG. 12 is an end view in elevation, partially in cross section, similar to FIG. 9 but illustrating the relative positions of the draft vehicle and the load platform when traversing unlevel terrain with the left rear wheels supported on a markedly higher surface.
Figure 13:
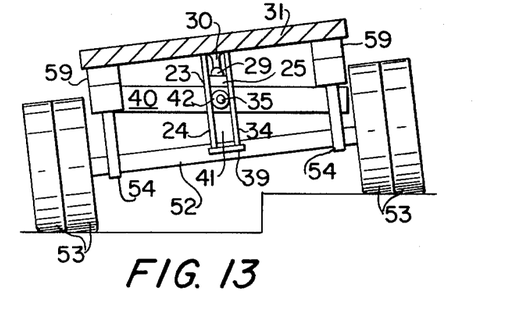
FIG. 13 is a view similar to FIG. 12, but illustrating the relative movement of the draft vehicle and the load platform when traversing unlevel terrain with the left rear wheels supported on a markedly lower surface.

As is best seen in FIGS. 4-7 and 10-13 of the drawings, the primary coupler 23 provides the towing capture between the truck 21 and load platform 22, and also allows the load platform 22 to move dynamically around the longitudinal roll axis and pitch axis with the coupler 23 serving as the primary axes. As is illustrated in FIG. 10 and shown in phantom line at 60 in FIG. 7, the frame member 31 is supported above the upper surface 33 of frame 26 by coupler 23 on the forward end, and by the suspension system 54 and frame members 59 on the rear end, a distance sufficient to allow the probe 35 to assume the illustrated positions within space 41 while maintaining a clearance between the rear end of the truck frame 26 and the platform frame member 31. Similarly, as illustrated in FIGS. 7 and 11, the front end 56 of load platform 22 is positioned behind cab 58 a distance sufficient to allow clearance of the rear end 57 when the probe 35 assumes the illustrated position in space 41. As is best seen in FIGS. 4, 6 and 7, the position of the probe 35 in space 41 when the composite vehicle 20 is on level terrain is intermediate the extreme upper and lower movements of probe 35 illustrated in phantom line at 60 and 61. The relative positions of the probe 35 in the space 41 of coupler 24 in instances where the rear wheels 50 are on level ground and the wheels 53 are on unlevel ground are illustrated in FIGS. 12 and 13. The positions assumed by the socket ball 29 and socket 28 are likewise illustrated therein and are further illustrated diagramatically in FIG. 5. It is apparent from the foregoing that both the coupler 23 and the coupler 24 provide for relative dynamic movement between the truck 21 and load platform 22, at their respective points of capture and along the centerlines, around the longitudinal roll axis and in the vertical or pitch planes regardless of the position of the socket ball 29 in socket 28 or the position of the probe 35 in the space 41. Additionally, as is best seen in FIG. 6, the pin 46 extends fully across the rear surfaces of slide members 36 and 37 and in the event of the malfunction of coupler 23 due to socket ball 29 becoming dislodged from socket 28, the load platform 22 will be retained on truck 21 until the malfunction is corrected.

The restructuring method or system of the present invention includes a number of important improvements and unique advantages. Some of these are summarized below, as follows:

1. An extension is added to a standard truck bed. The resulting extending length is equal to at least the area supported by, or under the influence of, the tag-axle assembly that is mounted under the load platform at a position of tandem with reference to the truck drive axle.

2. An extended load-weight range is provided. The load increase over the original "carry only" capacity of the truck is equal to the net capacity of the tag axle.

3. The invention provides a unique composite loading system which includes a truck and an independent load platform. The inventive system retains the basic two axle four-wheel or six-wheel type of handling-steering characteristics and thus does not require special driving techniques.

4. In the inventive system, full bed loads, i.e., loads with more than normal rear platform overhang of the drive axle, have a natural tendency to stabilize the front steering wheels of the truck to the road, rather than causing a lightening of the front end and a consequent road drift condition. This latter condition is often characteristic of overhang loads on standard prior art trucks.

5. Under winter driving conditions in snow and ice, the tandem-like arrangement of the tag-axle and lateral capture of the load platform provide for positive forward movement stability with a minimum of conventional drive-wheel sideward "kickout".

6. The load platform may be easily adapted for use as a mobile base for field tooling, process equipment and the like that is generally mounted permanently upon a truck chassis. This adaption allows important economies as inexpensive lighter duty trucks replace higher priced heavier sprung trucks of the type that totally "carry" an equivalent load-range. This adaption also allows the load platform to be detached from the truck for long or short term field positioning, use of the truck unit for multiple purposes, or ease of servicing of the truck at overhaul facilities. The load platform also may be used as the fabrication base for equipment or tooling apparatus as material is processed through the manufacturing phase, and a truck unit is not required until delivery is made.

7. The inventive system is adaptable to any standard truck series and will take a selected truck into an increased load-range. The system is also adaptable to all truck body styles, such as van, dump, tanker, flatbed, grain box, or other.

8. The inventive system provides for increased wide-range axle differential vertical and roll movements and better unlevel surface transversing ability than conventional tag-axle attachments of the type used for extending the length of a truck bed.

The foregoing detailed description of the invention and the accompanying drawings are for purposes of illustration only, and are not intended as being limited to the spirit or scope of the appended claims.

I claim:

1. A composite automotive vehicle comprising
an automotive draft vehicle comprising a chassis, the chassis including front axle means, rear axle means, first frame means extending between the said front and rear axle means, and first suspension means carried by the said front and rear axle means for supporting the first frame means,
a load platform comprising a chassis, the chassis including tag axle means, second frame means extending from the said tag axle means to a point forward thereof, and second suspension means carried by the said tag axle means for supporting the second frame means,
primary coupler means for coupling the load platform to the automotive draft vehicle, the primary coupler means including first cooperating coupling means carried by the said first frame means between the front and rear axles and second cooperating coupling means carried by said second frame means forward of the tag axle, the said first and second coupling means cooperating to effectively couple the load platform to the draft vehicle whereby the load platform may be pulled by the draft vehicle,
the said first cooperating coupling means including a first coupler member and the said second cooperating coupling mens including a second coupler member, the said first and second coupler members including cooperating universal connecting means for universally connecting the said first and second coupler members whereby the draft vehicle and load platform at the point of coupling with the said primary coupler means are capable of dynamic relative articulated movement around the longitudinal roll and pitch axes and substantial relative lateral movement therebetween is prevented,
secondary coupler means for coupling the load platform to the automotive draft vehicle, the secondary coupler means including third cooperating coupling means carried by the said first frame means and fourth cooperating coupling means carried by the said second frame means, the third and fourth coupling means cooperating to effectively couple the load platform to te draft vehicle at a point behind the said rear axle and prevent substantial relative lateral movement therebetween,
the said primary coupler means and the said secondary coupler means being positioned substantially along the longitudinal centerlines of the load platform and draft vehicle and being effective to couple the load platform to the draft vehicle substantially along the longitudinal centerlines thereof,
the said primary coupler means and the said secondary coupler means being effective to prevent substantial lateral movement between the draft vehicle and the load platform whereby the load platform may be pulled by the draft vehicle with the said tag axle tagging true behind the said rear axle, and
the said primary coupler means and the said secondary coupler means being effective to allow dynamic relative movement between the load platform and the draft vehicle around the longitudinal roll axis and pitch axis thereof while preventing substantial relative lateral movement therebetween.

2. The composite automotive vehicle of claim 1 wherein the said primary coupler means is located at about the payload center of gravity with respect to the said first suspension means.

3. The composite automotive vehicle of claim 1 wherein the said secondary coupler means is located between the said rear axle and tag axle.

4. The composite automotive vehicle of claim 1 wherein the said primary coupler means is located at approximately the payload center of gravity with respect to the said first suspension means, and the said secondary coupler means is located between the said rear axle and tag axle.

5. An automotive draft vehicle adapted for coupling with an independent load platform to thereby provide a composite automotive vehicle, the said independent load platform being of the class comprising a load platform chassis, the load platform chassis including tag axle means, first frame means extending from the tag axle means to a point forward thereof, and first suspension means carried by the said tag axle means for supporting the first frame means, the automotive draft vehicle comprising a draft vehicle chassis, the draft vehicle chassis including front axle means, rear axle means, second frame means extending between the said front and rear axle means, and second suspension means carried by the said front and rear axle means for supporting the second frame means, first cooperating coupling means carried by the said second frame means between the said front and rear axle means for effectively coupling with second cooperating coupling means carried by the said first frame means forward of the tag axle means, the said first and second coupling means cooperating to form primary coupler means and effectively couple the load platform to the draft vehicle whereby the load platform may be pulled by the draft vehicle, the said first cooperating coupling means including a first coupler member and the said second cooperating coupling means including a second coupler member, the said first and second coupler members including cooperating universal connecting means for universally connecting the said first and second coupler members whereby the draft vehicle and load platform at the point of coupling with the said primary coupler means are capable of dynamic relative articulated movement around the longitudinal roll and pitch axes and substantial relative lateral movement therebetween is prevented, third cooperating coupling means carried by the said second frame means effectively coupling with fourth cooperating coupling means carried by the said first frame means, the said third and fourth coupling means cooperating to form secondary coupler means and effectively couple the load platform to the draft vehicle at a point behind the said rear axle means and prevent substantial relative lateral movement therebetween, the said first and third cooperating coupling means being positioned substantially along the longitudinal centerline of the draft vehicle and being effective to couple with the said second and fourth coupling means and form primary and secondary coupler means respectively which are positioned substantially along the longitudinal centerlines of the load platform and draft vehicle.

the said primary and secondary coupler means being effective to prevent substantial lateral movement between the draft vehicle and the load platform whereby the load platform may be pulled by the draft vehicle with the said tag axle means tagging true behind the rear axle means, and the said primary and secondary coupler means being effective to allow dynamic relative movement between the load platform and the draft vehicle around the longitudinal roll axis and pitch axis thereof while preventing substantial relative lateral movement therebetween.

6. The draft vehicle of claim 5 wherein the said first cooperating coupling means is located at about the payload center of gravity with respect to the said second suspension means.

7. The draft vehicle of claim 5 wherein the said third cooperating coupling means is located behind the rear axle means.

8. The draft vehicle of claim 5 wherein the said first cooperating coupling means is located at about the payload center of gravity with respect to the said second suspension means, and the said third cooperating coupling means is located behind the said rear axle means.

9. An independent load platform adapted for coupling with an automotive draft vehicle to thereby provide a composite automotive vehicle, the draft vehicle being of the class comprising a draft vehicle chassis, the draft vehicle chassis including front axle means, rear axle means, first frame means extending between the said front and rear axle means, and first suspension means carried by the said front and rear axle means for supporting the first frame means, the independent load platform comprising a load platform chassis, the load platform chassis including tag axle means, second frame means extending from the said tag axle means to a point forward thereof, and second suspension means carried by the tag axle means for supporting the second frame means, first cooperating coupling means carried by the said second frame means forward of the tag axle means for effectively coupling with second cooperating means carried by the said first frame means between the front and rear axle means, the said first and second coupling means cooperating to form primary coupler means and effectively couple the load platform to the draft vehicle whereby the load platform may be pulled by the draft vehicle, the said first cooperating coupling means including a first coupler member and the said second cooperating coupling means including a second coupler member, the said first and second coupler members including cooperating universal connecting means for universally connecting the said first and second coupler members whereby the draft vehicle and load platform at the point of coupling with the said primary coupler means are capable of dynamic relative articulated movement around the longitudinal roll and pitch axes and substantial relative lateral movement therebetween is prevented, third cooperating coupling means carried by the said second frame means for effectively coupling with fourth cooperating coupling means carried by the said first frame means, the said third and fourth coupling means cooperating to form secondary coupler means and effectively couple the load platform to the draft vehicle at a point behind the said rear axle means and prevent substantial relative lateral movement therebetween, the said first and third cooperating coupling means being positioned substantially along the longitudinal centerline of the load platform and being effective to couple with the said second and fourth coupling means and form primary and secondary coupler means respectively which are positioned substantially along the longitudinal centerlines of the load platform and draft vehicle, the said primary and secondary coupler means being effective to prevent substantial lateral movement between the load platform and the draft vehicle whereby the load platform may be pulled by the draft vehicle with the said tag axle means tagging true behind the said rear axle means, and the said primary and secondary coupler means being effective to allow dynamic relative movement between the load platform and the draft vehicle around the longitudinal roll axis and pitch axis thereof while preventing substantial relative lateral movement therebetween.

10. A composite automotive vehicle comprising an automotive draft vehicle comprising a chassis, the chassis including front axle means, rear axle means, first frame means extending between the said front and rear axle means, and first suspension means carried by the said front and rear axle means for supporting the first frame means, a load platform comprising a chassis, the chassis including tag axle means, second frame means extending from the said tag axle means to a point forward thereof, and second suspension means carried by the said tag axle means for supporting the second frame means, primary coupler means for coupling the load platform to the automotive draft vehicle, the primary coupler means including first cooperating coupling means carried by the said first frame means between the front and rear axles and second cooperating coupling means carried by said second frame means forward of the tag axle, the said first and second coupling means cooperating to effectively couple the load platform to the draft vehicle whereby the load platform may be pulled by the draft vehicle, the said primary coupler means including a ball and socket coupler whereby the draft vehicle and load platform at the point of coupling therewith are capable of dynamic relative articulated movement around the longitudinal roll and pitch axes and substantial relative lateral movement therebetween is prevented, secondary coupler means for coupling the load platform to the automotive draft vehicle, the secondary coupler means including third cooperating coupling means carried by the said first frame means and fourth cooperating coupling means carried by the said second frame means, the third and fourth coupling means cooperating to effectively couple the load platform to the draft vehicle at a point behind the said rear axle and prevent substantial relative lateral movement therebetween, the said primary coupler means and the said secondary coupler means being positioned substantially along the longitudinal centerlines of the load platform and draft vehicle and being effective to couple the load platform to the draft vehicle substantially along the longitudinal centerlines thereof, the said primary coupler means and the said secondary coupler means being effective to prevent substantial lateral movement between the draft vehicle and the load platform whereby the load platform may be pulled by the draft vehicle with the said tag axle tagging true behind the said rear axle, and the said primary coupler means and the said secondary coupler means being effective to allow dynamic relative movement between the load platform and the draft vehicle around the longitudinal roll axis and pitch axis thereof while preventing substantial relative lateral movement therebetween.

11. The composite automotive vehicle of claim 10 wherein the said primary coupler means is located at approximately the payload center of gravity with respect to the said first suspension means.

12. A composite automotive vehicle comprising an automotive draft vehicle comprising a chassis, the chassis including front axle means, rear axle means, first frame means extending between the said front and rear axle means, and first suspension means carried by the said front and rear axle means for supporting the first frame means, a load platform comprising a chassis, the chassis including tag axle means, second frame means extending from the said tag axle means to a point forward thereof, and second suspension means carried by the said tag axle means for supporting the second frame means, primary coupler means for coupling the load platform to the automotive draft vehicle, the primary coupler means including first cooperating coupling means carried by the said first frame means between the front and rear axles and second cooperating coupling means carried by said second frame means forward of the tag axle, the said first and second coupling means cooperating to effectively couple the load platform to the draft vehicle whereby the load platform may be pulled by the draft vehicle, secondary coupler means for coupling the load platform to the automotive draft vehicle, the secondary coupler means including third cooperating coupling means carried by the said first frame means and fourth cooperating coupling means carried by the said second frame means, the third and fourth coupling means cooperating to effectively couple the load platform to the draft vehicle at a point behind the said rear axle and prevent substantial relative lateral movement therebetween, the said secondary coupler means including an elongated probe and an elongated slide, the probe having a forward portion securely mounted on the said first frame means and a rear portion extending rearward therefrom, the slide including elongated spaced members having upper portions securely mounted on the said second frame means and lower portions extending downward therefrom whereby a slide slot is formed therebetween of a width and length sufficient to receive the probe, and the rear portion of the probe extending through the slide slot to thereby couple the load platform to the draft vehicle, the draft vehicle and load platform at the point of coupling with the probe and slide being capable of dynamic relative articulated movement around the longitudinal roll and pitch axes while preventing substantial relative lateral movement therebetween, the said primary coupler means and the said secondary coupler means being positioned substantially along the longitudinal centerlines of the load platform and draft vehicle and being effective to couple the load platform to the draft vehicle substantially along the longitudinal centerlines thereof, the said primary coupler means and the said secondary coupler means being effective to prevent substantial lateral movement between the draft vehicle and the load platform whereby the load platform may be pulled by the draft vehicle with the said tag axle tagging true behind the said rear axle, and the said primary coupler means and the said secondary coupler means being effective to allow dynamic relative movement between the load platform and the draft vehicle around the longitudinal roll axis and pitch axis thereof while preventing substantial relative lateral movement therebetween.

13. The composite automotive vehicle of claim 12 wherein the said secondary coupler means is located between the said rear axle and tag axle.

14. The composite automotive vehicle of claim 12 wherein the rear portion of the probe is substantially round and extends substantially horizontally through the slide slot, the rear portion of the probe has a rotatable resilient sleeve thereon, the said lower portions of the spaced members are substantially upright whereby a substantially upright slide slot is formed therebetween, and the slide slot has a width and length sufficient to receive the resilient sleeve and allow it to rotate freely.

15. The composite automotive vehicle of claim 14 wherein a retaining means is provided on the rear portion of the probe which has passed through the slide slot, the retaining means being effective to retain the said resilient sleeve within the slide slot and to prevent loss of the load platform from the draft vehicle in the event that the primary coupling means becomes inoperative.

16. An automotive draft vehicle adapted for coupling with an independent load platform to thereby provide a composite automotive vehicle, the said independent load platform being of the class comprising a load platform chassis, the load platform chassis including tag axle means, first frame means extending from the tag axle means to a point forward thereof, and first suspension means carried by the said tag axle means for supporting the first frame means, the automotive draft vehicle comprising a draft vehicle chassis, the draft vehicle chassis including front axle means, rear axle means, second frame means extending between the said front and rear axle means, and second suspension means carried by the said front and rear axle means for supporting the second frame means, first cooperating coupling means carried by the said second frame means between the said front and rear axle means for effectively coupling with second cooperating coupling means carried by the said first frame means forward of the tag axle means, the said first and second coupling means cooperating to form primary coupler means and effectively couple the load platform to the draft vehicle whereby the load platform may be pulled by the draft vehicle, the said primary coupler means including a ball and socket coupler and the said first cooperating coupling means including one component thereof, third cooperating coupling means carried by the said second frame means for effectively coupling with fourth cooperating coupling means carried by the said first frame means, the said third and fourth coupling means cooperating to form secondary coupler means and effectively couple the load platform to the draft vehicle at a point behind the said rear axle means and prevent substantial relative lateral movement therebetween, the said first and third cooperating coupling means being positioned substantially along the longitudinal centerline of the draft vehicle and being effective to couple with the said second and fourth coupling means and form primary and secondary coupler means respectively which are positioned substantially along the longitudinal centerlines of the load platform and draft vehicle, the said primary and secondary coupler means being effective to prevent substantial lateral movement between the draft vehicle and the load platform whereby the load platform may be pulled by the draft vehicle with the said tag axle means tagging true behind the rear axle means, and the said primary and secondary coupler means being effective to allow dynamic relative movement between the load platform and the draft vehicle around the longitudinal roll axis and pitch axis thereof while preventing substantial relative lateral movement therebetween.

17. An automotive draft vehicle adapted for coupling with an independent load platform to thereby provide a composite automotive vehicle, the said independent load platform being of the class comprising a load platform chassis, the load platform chassis including tag axle means, first frame means extending from the tag axle means to a point forward thereof and first suspension means carried by the said tag axle means for supporting the first frame means, the automotive draft vehicle comprising a draft vehicle chassis, the draft vehicle chassis including front axle means, rear axle means, second frame means extending between the said front and rear axle means, and second suspension means carried by the said front and rear axle means for supporting the second frame means, first cooperating coupling means carried by the said second frame means between the said front and rear axle means for effectively coupling with second cooperating coupling means carried by the said first frame means forward of the tag axle means, the said first and second coupling means cooperating to form primary coupler means and effectively couple the load platform to the draft vehicle whereby the load platform may be pulled by the draft vehicle, third cooperating coupling means carried by the said second frame means for effectively coupling with fourth cooperating coupling means carried by the said first frame means, the said third and fourth coupling means cooperating to form secondary coupler means and effectively couple the load platform to the draft vehicle at a point behind the said rear axle means and prevent substantial relative lateral movement therebetween, the said third cooperating coupling means including an elongated probe, the probe having a forward portion securely mounted on the said second frame means behind the said rear axle means and a rear portion extending rearward therefrom, the said first and third cooperating coupling means being positioned substantially along the longitudinal centerline of the draft vehicle and being effective to couple with the said second and fourth coupling means and form primary and secondary coupler means respectively which are positioned substantially along the longitudinal centerlines of the load platform and draft vehicle, the said primary and secondary coupler means being effective to prevent substantial lateral movement between the draft vehicle and the load platform whereby the load platform may be pulled by the draft vehicle with the said tag axle means tagging true behind the rear axle means, and the said primary and secondary coupler means being effective to allow dynamic relative movement between the load platform and the draft vehicle around the longitudinal roll axis and pitch axis thereof while preventing substantial relative lateral movement therebetween.

18. The draft vehicle of claim 17 wherein the rear portion of the probe is substantially round and extends substantially horizontally, and the rear portion of the probe has a rotatable resilient sleeve thereon.

19. The draft vehicle of claim 18 wherein a retaining means is provided on the rear portion of the probe to retain the said resilient sleeve thereon and to prevent loss of the load platform from the draft vehicle in the event that the primary coupling means becomes inoperative.

20. An independent load platform adapted for coupling with an automotive draft vehicle to thereby provide a composite automotive vehicle, the draft vehicle being of the class comprising a draft vehicle chassis, the draft vehicle chassis including front axle means, rear axle means, first frame means extending between the said front and rear axle means, and first suspension means carried by the said front and rear axle means for supporting the first frame means, the independent load platform comprising a load platform chassis, the load platform chassis including tag axle means, second frame means extending from the said tag axle means to a point forward thereof, and second suspension means carried by the tag axle means for supporting the second frame means, first cooperating coupling means carried by the said second frame means forward of the tag axle means for effectively coupling with second cooperating coupling means carried by the said first frame means between the front and rear axle means, the said first and second coupling means cooperating to form primary coupler means and effectively couple the load platform to the draft vehicle whereby the load platform may be pulled by the draft vehicle, the said primary coupler means including a ball and socket coupler and the said first cooperating coupling means including one component thereof, and the said second cooperating coupling means including the other component thereof third cooperating coupling means carried by the said second frame means for effectively coupling with fourth cooperating coupling means carried by the said first frame means, the said third and fourth coupling means cooperating to form secondary coupler means and effectively couple the load platform to the draft vehicle at a point behind the said rear axle means and prevent substantial relative lateral movement therebetween, the said first and third cooperating coupling means being positioned substantially along the longitudinal centerline of the load platform and being effective to couple with the said second and fourth coupling means and form primary and secondary coupler means respectively which are positioned substantially along the longitudinal centerlines of the load platform and draft vehicle, the said primary and secondary coupler means being effective to prevent substantial lateral movement between the load platform and the draft vehicle whereby the load platform may be pulled by the draft vehicle with the said tag axle means tagging true behind the said rear axle means, and the said primary and secondary coupler means being effective to allow dynamic relative movement between the load platform and the draft vehicle around the longitudinal roll axis and pitch axis thereof while preventing substantial relative lateral movement therebetween.

21. An independent load platform adapted for coupling with an automotive draft vehicle to thereby provide a composite automotive vehicle, the draft vehicle being of the class comprising a draft vehicle chassis, the draft vehicle chassis including front axle means, rear axle means, first frame means extending between the said front and rear axle means, and said first suspension means carried by the said front and rear axle means for supporting the first frame means, the independent load platform comprising a load platform chassis, the load platform chassis including tag axle means, second frame means extending from the said tag axle means to a point forward thereof, and second suspension means carried by the tag axle means for supporting the second frame means, first cooperating coupling means carried by the said second frame means forward of the tag axle means for effectively coupling with second cooperating coupling means carried by the said first frame means between the front and rear axle means, the said first and second coupling means cooperating to form primary coupler means and effectively couple the load platform to the draft vehicle whereby the load platform may be pulled by the draft vehicle, third cooperating coupling means carried by the said second frame means for effectively coupling with fourth cooperating coupling means carried by the said first frame means, the said third and fourth coupling means cooperating to form secondary coupler means and effectively couple the load platform to the draft vehicle at a point behind the said rear axle means and prevent substantial relative lateral movement therebetween, the said third cooperating coupling means including an elongated slide and the said fourth cooperating coupling means including an elongated probe, the slide including spaced members having upper portions securely mounted on the said second frame means and lower portions extending downward therefrom whereby a slide slot is formed therebetween of a width and length sufficient to receive the probe and whereby the load platform is coupled to the draft vehicle by extending the rear portion of the probe through the slide slot, the draft vehicle and load platform at the point of coupling with the probe and slide being capable of dynamic relative articulated movement around the longitudinal roll axis and pitch axis, the said first and third cooperating coupling means being positioned substantially along the longitudinal centerline of the load platform and being effective to couple with the said second and fourth coupling means and form primary and secondary coupler means respectively which are positioned substantially along the longitudinal centerlines of the load platform and draft vehicle, the said primary and secondary coupler means being effective to prevent substantial lateral movement between the load platform and the draft vehicle whereby the load platform may be pulled by the draft vehicle whereby the load platform may be pulled by the draft vehicle with the said tag axle means tagging true behind the said rear axle means, and the said primary and secondary coupler means being effective to allow dynamic relative movement between the load platform and the draft vehicle around the longitudinal roll axis and pitch axis thereof while preventing substantial relative lateral movement therebetween.

22. The load platform of claim 21 wherein the said third cooperating coupling means is located between the said rear axle means and tag axle means.

23. The load platform of claim 21 wherein the said primary coupler means is a ball and socket coupler and the said first cooperating coupling means includes one component thereof.

24. A method of coupling an independent load platform to an automotive draft vehicle and thereby providing a composite automotive vehicle comprising providing an automotive draft vehicle comprising a first chassis, the first chassis including front axle means, rear axle means, first frame means extending between the front and rear axle means, and first suspension means carried by the front and rear axle means for supporting the first frame means, providing an independent load platform comprising a second chassis, the second chassis including tag axle means, second frame means extending from the tag axle means to a point forward thereof, and second suspension means carried by the tag axle means for supporting the second frame means, coupling the load platform to the draft vehicle employing primary coupler means including first cooperating coupling means carried by the said first frame means between the front and rear axles and second cooperating coupling means carried by the said second frame means forward of the tag axle, the said first and second coupling means cooperating to effectively couple the load platform to the draft vehicle whereby the load platform may be pulled by the draft vehicle and substantial relative lateral movement therebetween is prevented, the said first cooperating coupling means including a first coupler member and the said second cooperating coupling means including a second coupler member, the said first and second coupler members including cooperating universal connecting means for universally connecting the said first and second coupler members whereby the draft vehicle and load platform at the point of coupling with the said primary coupler means are capable of dynamic relative articulated movement around the longitudinal roll and pitch axes and substantial relative lateral movement therebetween is prevented, coupling the load platform to the automotive draft vehicle employing secondary coupler means including third cooperating coupling means carried by the said first frame means and fourth cooperating coupling means carried by the said second frame means, the third and fourth coupling means cooperating to effectively couple the load platform to the draft vehicle at a point behind the said rear axle means and prevent substantial relative lateral movement therebetween, the load platform being coupled to the draft vehicle substantially along the longitudinal centerlines thereof whereby the load platform may be pulled by the draft vehicle with the said tag axle means tagging true behind the said rear axle means, and the load platform being coupled to the draft vehicle employing primary and secondary coupler means which provide for dynamic relative movement between the load platform and draft vehicle around the longitudinal roll axis and pitch axis thereof while preventing substantial relative lateral movement therebetween.

25. The method of claim 24 wherein the load platform is coupled to the draft vehicle by the said primary coupler means at about the payload center of gravity with respect to the said first suspension means.

26. The method of claim 24 wherein the load platform is coupled to the draft vehicle by the said secondary coupler means between the said rear axle means and tag axle means.

27. The method of claim 24 wherein the load platform is coupled to the draft vehicle by the said primary coupler means at about the payload center of gravity with respect to the said first suspension means and by the said secondary coupler means between the said rear axle means and tag axle means, the coupled load platform and draft vehicle being capable of dynamic relative articulated movement around the longitudinal roll axis and pitch axis.

28. The method of claim 24 wherein the said primary coupler means is a ball and socket coupler and the draft vehicle and platform at the point of coupling therewith are capable of dynamic relative articulated movement around the longitudinal roll and pitch axes and substantial relative lateral movement therebetween is prevented.

29. The method of claim 24 wherein the said secondary coupling means includes an elongated probe and an elongated slide, the probe having a forward portion securely mounted on the said first frame means and a rear portion extending rearward therefrom, the slide including elongated spaced members having upper portions securely mounted on the said second frame means and lower portions extending downward therefrom whereby a slide slot is formed therebetween of a width and length sufficient to receive the probe, and the rear portion of the probe extending through the slide slot to thereby couple the load platform to the draft vehicle, the draft vehicle and load platform at the point of coupling with the probe and slide being capable of dynamic relative articulated movement around the longitudinal roll and pitch axes while preventing substantial relative lateral movement therebetween.

* * * * *

UNITED STATES PATENT AND TRADEMARK OFFICE
CERTIFICATE OF CORRECTION

PATENT NO. : 4,049,289
DATED : September 20, 1977
INVENTOR(S) : RODGER E. DECKROW It is certified that error appears in the above-identified patent and that said Letters Patent are hereby corrected as shown below:

Column 8, line 19, "mens" should read -- means -- ;

line 36, "te" should read -- the -- ;

Column 16, line 16, delete "said" (second occurrence)

Column 17, line 3, delete "whereby the load platform may be" ; and line 4, delete "pulled by the draft vehicle.."

Signed and Sealed this

Eighth Day of May 1979

[SEAL]

Attest:

RUTH C. MASON
Attesting Officer

DONALD W. BANNER
Commissioner of Patents and Trademarks